US012794042B2

(12) United States Patent
Kwon et al.

(10) Patent No.: US 12,794,042 B2
(45) Date of Patent: Nov. 10, 2026

(54) BATTERY RACK AND ENERGY STORAGE SYSTEM COMPRISING SAME

(71) Applicant: LG ENERGY SOLUTION, LTD., Seoul (KR)

(72) Inventors: Min-Seok Kwon, Daejeon (KR); Young-Joon Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 654 days.

(21) Appl. No.: 18/029,884

(22) PCT Filed: Jul. 14, 2022

(86) PCT No.: PCT/KR2022/010320
§ 371 (c)(1),
(2) Date: Mar. 31, 2023

(87) PCT Pub. No.: WO2023/287234
PCT Pub. Date: Jan. 19, 2023

(65) Prior Publication Data

US 2023/0369679 A1 Nov. 16, 2023

(30) Foreign Application Priority Data

Jul. 16, 2021 (KR) ........................ 10-2021-0093532

(51) Int. Cl.
*H01M 10/6567* (2014.01)
*H01M 10/613* (2014.01)
(Continued)

(52) U.S. Cl.
CPC ..... *H01M 10/6567* (2015.04); *H01M 10/613* (2015.04); *H01M 10/625* (2015.04);
(Continued)

(58) Field of Classification Search
CPC ............. H01M 10/613; H01M 10/625; H01M 10/6567; H01M 50/204; H01M 50/233; H01M 50/249
See application file for complete search history.

(56) References Cited

U.S. PATENT DOCUMENTS

2012/0164489 A1 6/2012 Okada et al.
2013/0235499 A1 9/2013 Kang et al.
(Continued)

FOREIGN PATENT DOCUMENTS

CN 102544427 A 7/2012
CN 103000841 B 5/2016
(Continued)

OTHER PUBLICATIONS

Machine translation of JP2016171028A. (Year: 2016).*

*Primary Examiner* — Jonathan G Jelsma
(74) *Attorney, Agent, or Firm* — Bryan Cave Leighton Paisner LLP

(57) ABSTRACT

A battery rack and an energy storage system comprising the same are provided. The battery rack includes at least one battery pack used for a predetermined period of time or of which a predetermined capacity consumed; and a battery pack frame accommodating the at least one battery pack and having a height greater than a height of the at least one battery pack, and the at least one battery pack includes a service plug configured to open an inside of the at least one battery pack, thereby providing increased safety against fire resulting from an abnormal situation such as overheat.

11 Claims, 10 Drawing Sheets

(51) Int. Cl.

| | |
|---|---|
| ***H01M 10/625*** | (2014.01) |
| ***H01M 50/204*** | (2021.01) |
| ***H01M 50/233*** | (2021.01) |
| ***H01M 50/249*** | (2021.01) |
| ***H01M 50/298*** | (2021.01) |

(52) U.S. Cl.

CPC ....... *H01M 50/204* (2021.01); *H01M 50/233* (2021.01); *H01M 50/249* (2021.01); *H01M 50/298* (2021.01); *H01M 2200/20* (2013.01); *H01M 2220/20* (2013.01)

(56) References Cited

U.S. PATENT DOCUMENTS

| | | | |
|---|---|---|---|
| 2015/0280182 | A1 | 10/2015 | Gibeau |
| 2018/0205058 | A1 | 7/2018 | Lee et al. |
| 2018/0269440 | A1 | 9/2018 | Lee et al. |
| 2019/0372070 | A1 | 12/2019 | Jeon |
| 2020/0101335 | A1 | 4/2020 | Liu et al. |
| 2021/0077842 | A1 | 3/2021 | Skoskiewicz |
| 2021/0168964 | A1 | 6/2021 | Nakaya |
| 2022/0285760 | A1 | 9/2022 | Jung et al. |

FOREIGN PATENT DOCUMENTS

| | | | | |
|---|---|---|---|---|
| CN | 107658512 | A | | 2/2018 |
| CN | 207303275 | | | 5/2018 |
| CN | 110199444 | A | | 9/2019 |
| CN | 110960819 | A | | 4/2020 |
| CN | 111029674 | | | 4/2020 |
| CN | 212725503 | U | * | 3/2021 |
| EP | 2624332 | A1 | | 2/2013 |
| JP | 2013-159235 | A | | 8/2013 |
| JP | 2014-517479 | A | | 7/2014 |
| JP | 2015-201380 | A | | 11/2015 |
| JP | 2016171028 | A | * | 9/2016 |
| JP | 2021-91283 | A | | 6/2021 |
| KR | 10-2017-0062732 | A | | 6/2017 |
| KR | 10-2017-0068406 | A | | 6/2017 |
| KR | 10-2018-0019817 | A | | 2/2018 |
| KR | 10-2199307 | B1 | | 1/2021 |
| KR | 10-2021-0020443 | A | | 2/2021 |
| KR | 10-2021-0056268 | A | | 5/2021 |
| WO | 2019-207852 | A1 | | 10/2019 |

* cited by examiner

BATTERY RACK AND ENERGY STORAGE SYSTEM COMPRISING SAME

CROSS-REFERENCE TO RELATED APPLICATION

This application is a National Phase entry pursuant to 35 U.S.C. 371 of International Application No. PCT/KR2022/010320 filed on Jul. 14, 2022, which claims priority to Korean Patent Application No. 10-2021-0093532 filed on Jul. 16, 2021, the disclosures of which are incorporated herein by reference in their entireties.

TECHNICAL FIELD

The present disclosure relates to a battery rack and an energy storage system comprising the same.

BACKGROUND

Due to their characteristics of being easily applicable to various products and electrical properties such as high energy density, secondary batteries are not only commonly applied to portable devices, but universally applied to electric vehicles (EVs) or hybrid electric vehicles (HEVs) that are driven by an electrical driving source. In addition to the primary advantage that it is possible to remarkably reduce the use of fossil fuels, secondary batteries do not produce by-products from the use of energy, so they are gaining attention as a new eco-friendly and energy efficient source of energy.

The types of secondary batteries widely used at present include lithium ion batteries, lithium polymer batteries, nickel cadmium batteries, nickel hydrogen batteries, nickel zinc batteries or the like. A unit secondary battery cell or a unit battery cell has an operating voltage of about 2.5V to 4.5V. Accordingly, when a higher output voltage is required, a plurality of battery cells may be connected in series to form a battery pack. Additionally, the battery pack may be fabricated by connecting the plurality of battery cells in parallel according to the charge/discharge capacity required for the battery pack. Accordingly, the number of battery cells included in the battery pack may be variously set depending on the required output voltage or charge/discharge capacity.

Meanwhile, when fabricating the battery pack by connecting the plurality of battery cells in series/in parallel, it is general to make a battery module including at least one battery cell, and then fabricate a battery pack or a battery rack using at least one battery module with an addition of any other component. Meanwhile, an energy storage system including at least one battery rack is constructed as an energy source.

When the battery pack in an electric vehicle is used for a predetermined period of time or of which a predetermined capacity is consumed, in general, the battery pack is wasted due to the reduced driving performance of the vehicle. In general, the wasted battery pack includes cobalt oxide, lithium, manganese, nickel or the like, causing environmental pollution or dangers related to fires or electric shocks.

About 70 to 80% of the wasted battery packs from electric vehicles may be reused in other applications than the fuel source of vehicles. In particular, the waste battery packs from electric vehicles may be reused in energy storage systems (ESSs). The waste battery packs from electric vehicles for reuse are referred to as reuse battery packs.

Accordingly, there is a need for an approach to reuse the battery pack used for the predetermined period of time or of which the predetermined capacity consumed, that is, the reuse battery pack, more stably in the industrial applications such as energy storage systems. In particular, since the battery pack used for the predetermined period of time or of which the predetermined capacity consumed may have a higher fire risk caused by overheat, the design or fire prevention mechanism of a structure accommodating the battery pack, such as a battery pack frame, is emerging as the more important factor.

SUMMARY

The present disclosure is directed to providing a battery rack for receiving a battery pack for reuse after the use for a predetermined period of time or of which a predetermined capacity consumed more stably and ensuring safety when a fire occurs due to an abnormal situation such as overheat, and an energy storage system comprising the same.

To solve the above-described problem, the present disclosure provides a battery rack including at least one battery pack used for a predetermined period of time or of which a predetermined capacity consumed; and a battery pack frame accommodating the at least one battery pack, and having a height greater than a height of the at least one battery pack, wherein the at least one battery pack includes a service plug configured to open an inside of the at least one battery pack.

A coolant may be injected into the battery pack frame such that the at least one battery pack is submerged in the coolant at a predetermined depth when an abnormal situation occurs in the at least one battery pack.

The service plug may open the inside of the at least one battery pack to guide the direct injection of the coolant into the at least one battery pack when an internal pressure of the at least one battery pack rises above a predetermined pressure in the event of the abnormal situation.

The service plug may be disposed on an upper surface of the at least one battery pack.

At least one feed pipe for feeding the coolant may be disposed above the battery pack frame.

The at least one feed pipe may include at least one sprinkler to spray the coolant onto the at least one battery pack.

The service plug may be disposed close to the at least one sprinkler.

The battery pack frame may further comprise at least one cable through-hole portion and at least one electrical cable may be passed through the at least one cable through-hole portion to connect to the at least one battery pack.

At least one cable sealing member may be mounted in the at least one cable through-hole portion to prevent a leakage of the coolant.

The at least one battery pack may be a used battery pack from an electric vehicle or a hybrid electric vehicle.

The battery rack may include a plurality of the battery packs, and each of the plurality of battery packs may be stacked on top of each other in a height direction of the battery rack such that they are electrically connected to each other.

Additionally, the present disclosure provides an energy storage system including at least one battery rack according to the above-described embodiments.

According to the various embodiments as described above, it is possible to provide a battery rack for receiving a battery pack for reuse after the use for a predetermined period of time or of which a predetermined capacity consumed more stably and ensuring safety when a fire occurs due to an abnormal situation such as overheat, and an energy storage system comprising the same.

BRIEF DESCRIPTION OF DRAWINGS

The accompanying drawings illustrate an exemplary embodiment of the present disclosure and together with the following detailed description, serve to provide further understanding of the technical features of the present disclosure, and thus the present disclosure is not construed as being limited to the drawings.

DETAILED DESCRIPTION

The present disclosure will become apparent by describing exemplary embodiments of the present disclosure in detail with reference to the accompanying drawings. The disclosed embodiments are provided by way of illustration to help the understanding of the present disclosure, and it should be understood that the present disclosure may be embodied in many other forms. Additionally, to help the understanding of the present disclosure, some elements in the accompanying drawings may be depicted on an exaggerated scale, not the actual scale.

Figure 1:
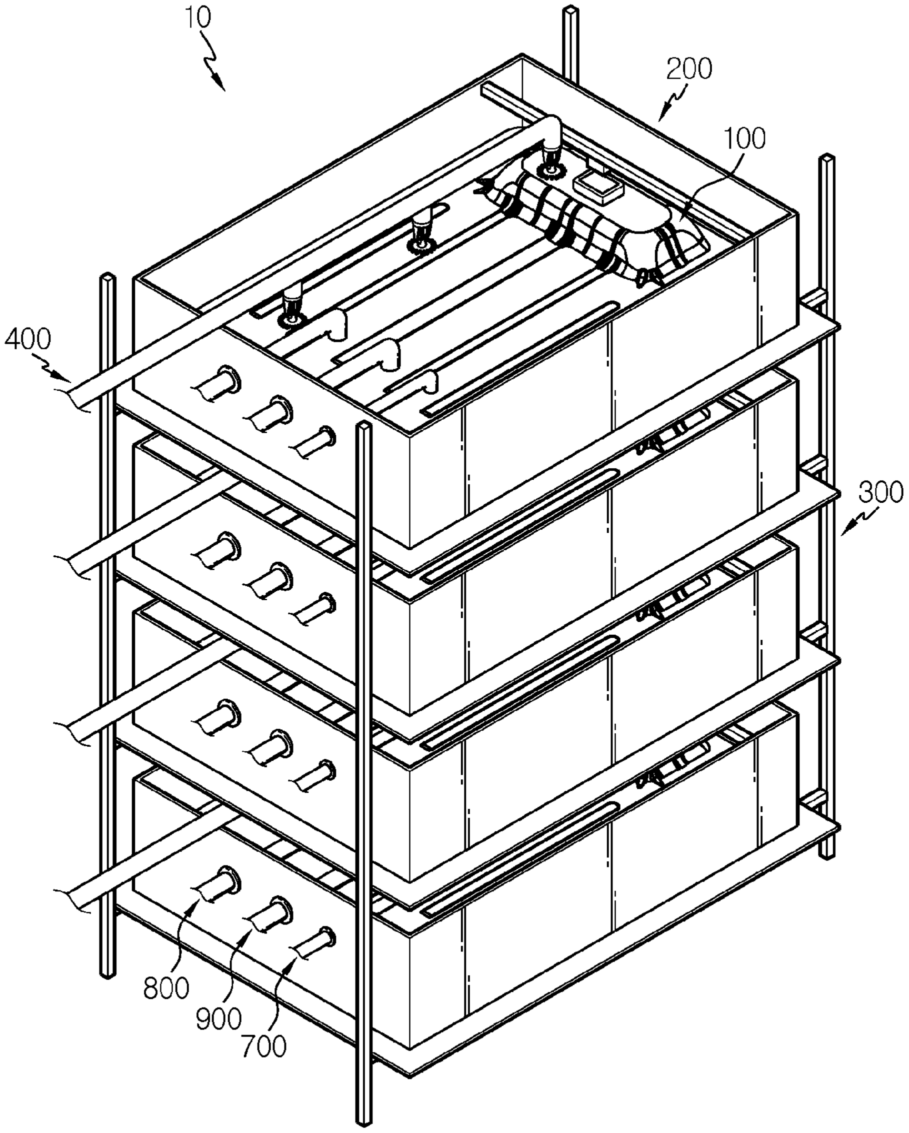
FIG. 1 is a diagram illustrating a battery rack according to an embodiment of the present disclosure.

FIG. 1 is a diagram illustrating a battery rack according to an embodiment of the present disclosure.

Referring to FIG. 1, the battery rack 10 may include at least one battery pack 100 and at least one battery pack frame 200 accommodating the at least one battery pack 100. Here, the at least one battery pack 100 may include a service plug 150 configured to open the at least one battery pack 100 to guide the direct injection of a coolant into the at least one battery pack 100 when the internal pressure of the at least one battery pack 100 rises above a predetermined pressure in the event of an abnormal situation. The service plug 150 will be described in more detail below.

The at least one battery pack 100 may be a battery pack used for a predetermined period of time or of which a predetermined capacity consumed. Specifically, the at least one battery pack 100 may be a used battery pack from an electric vehicle or a hybrid electric vehicle. The at least one battery pack may be referred to as a reuse battery pack.

One or more battery packs 100 may be included. Hereinafter, this embodiment is described based on the plurality of battery packs 100.

Hereinafter, the battery pack 100 will be described in more detail.

Figure 2:
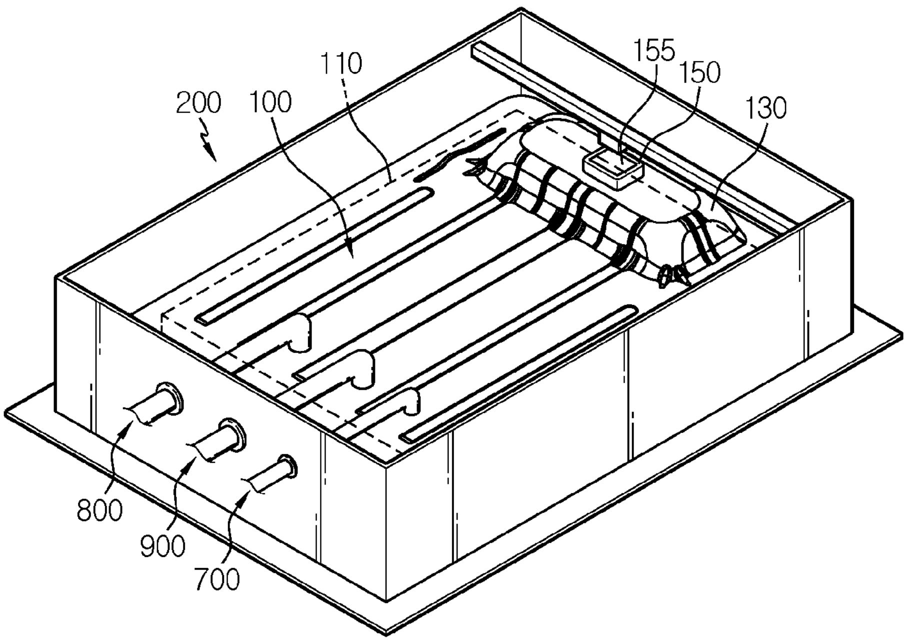
FIG. 2 is a diagram illustrating a battery pack of the battery rack of FIG. 1.

FIG. 2 is a diagram illustrating the battery pack of the battery rack of FIG. 1.

Referring to FIG. 2, the battery pack 100 may include a battery cell 110, a pack case 130 and the service plug 150.

The battery cell 110 may include a secondary battery, for example, a pouch type secondary battery, a prismatic secondary battery or a cylindrical secondary battery. Hereinafter, this embodiment is described by taking a secondary battery, to be exact, a pouch type secondary battery, as an example of the battery cell 110.

One or more battery cells 110 may be included. Hereinafter, this embodiment is described based on the plurality of battery cells 110 electrically connected to each other to form a battery cell assembly.

The pack case 130 may accommodate the plurality of battery cells 110 and different types of electrical components and a cooling unit of the battery pack 100. To this end, the pack case 130 may have an accommodation space in which the components of the battery pack 100 are received.

The service plug 150 is configured to disconnect the electrical connection of the battery pack 100 by the user manipulation to prevent electric shock accidents in the operator's inspection or management of the battery pack 100, and may be mounted in the pack case 130 and electrically connected to the battery cells 110 or the electrical components of the battery pack 100.

The service plug 150 may open the at least one battery pack 100 to guide the direct injection of the coolant into the at least one battery pack 100 when the internal pressure of the at least one battery pack 100 rises above the predetermined pressure in the event of the abnormal situation.

The service plug 150 may be disposed on the upper surface of the battery pack 100, i.e., on the pack case 130 to allow the user or the operator to easily manipulate. Furthermore, the service plug 150 may be disposed close to the bottom of the feed pipe 400 on the upper surface of the pack case 130 to smoothly inject the coolant into the battery pack 100 in the event of the abnormal situation. Specifically, the service plug 150 may be disposed close to at least one sprinkler 450 of the feed pipe 400 as described below.

A plug cover 155 may be disposed above the service plug 150 configured to open the service plug 150 to make the inside and outside of the pack case 130 of the battery pack 100 communicate with each other when the internal pressure of the battery pack 100 rises above the predetermined pressure. The plug cover 155 may operate to open the service plug 150 when the internal pressure of the battery pack 100 rises above the predetermined pressure. The opening operation of the plug cover 155 may be performed by a passive or active method. For example, the plug cover 155 may be a rotatable structure or a valve structure which is opened at the predetermined pressure, or a rotatable structure or a valve structure which is connected to an electric controller of the battery pack 100 to operate by the control of the electric controller at the predetermined pressure. This is provided for illustrative purpose, and the opening/closing structure of the plug cover 155 may use any other method of opening the service plug 150 when the internal pressure of the battery pack 100 is equal to or higher than the predetermined pressure.

The at least one battery pack frame 200 may accommodate the at least one battery pack 100 used for the predetermined period of time or of which the predetermined capacity consumed, and may have a height greater than a height of the at least one battery pack 100.

When the abnormal situation occurs due to overheat of the at least one battery pack 100, the at least one battery pack frame 200 may be filled with the coolant C such that the at least one battery pack 100 is submerged in the coolant C at a predetermined depth.

The at least one battery pack frame 200 may receive the at least one battery pack 100 used for the predetermined period of time or of which the predetermined capacity consumed more stably and control a dangerous situation such as a fire through the coolant C filled inside more quickly when the dangerous situation such as the fire occurs due to the abnormal situation caused by overheat of the at least one battery pack 100.

A plurality of battery pack frame 200 may be included, and each of the plurality of battery pack frames 200 may be stacked on top of each other in the height direction of the battery rack 10.

Hereinafter, the at least one battery pack frame 200 will be described in more detail.

Figure 3:
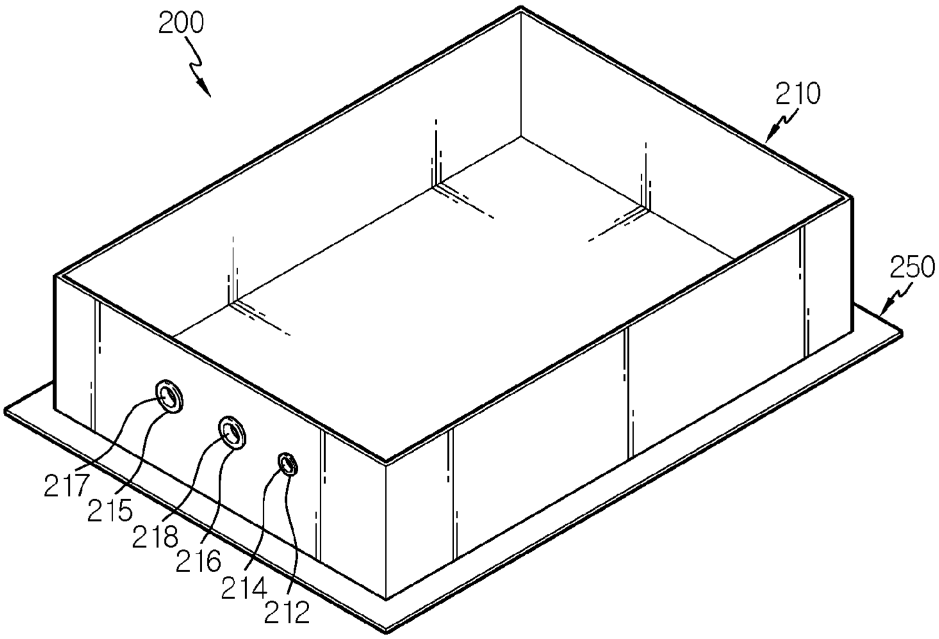
FIG. 3 is a diagram illustrating a battery pack frame of the battery rack of FIG. 1.

FIG. 3 is a diagram illustrating the battery pack frame of the battery rack of FIG. 1.

Referring to FIG. 3, the battery pack frame 200 may have an accommodation space which is exposed to top, and the at least one battery pack 100 may be received in the accommodation space.

At least one feed pipe 400 (see FIG. 5) for feeding the coolant C may be disposed above the battery pack frame 200. The at least one feed pipe 400 will be described in more detail below.

Additionally, at least one smoke detection sensor 500 (see FIG. 5) may be disposed at the upper part of the battery pack frame 200 to detect smoke when an abnormal situation occurs due to the overheat of the at least one battery pack 100. The at least one smoke detection sensor 500 will be described in more detail below.

Furthermore, the at least one smoke detection sensor 500 (see FIG. 5) may be mounted at the upper part of the battery pack frame 200, and a sensor support 600 may be configured to support the at least one smoke detection sensor 500. The sensor support 600 will be described in more detail below.

The battery pack frame 200 may include a water tank frame 210 and a support frame 250.

Figure 7:
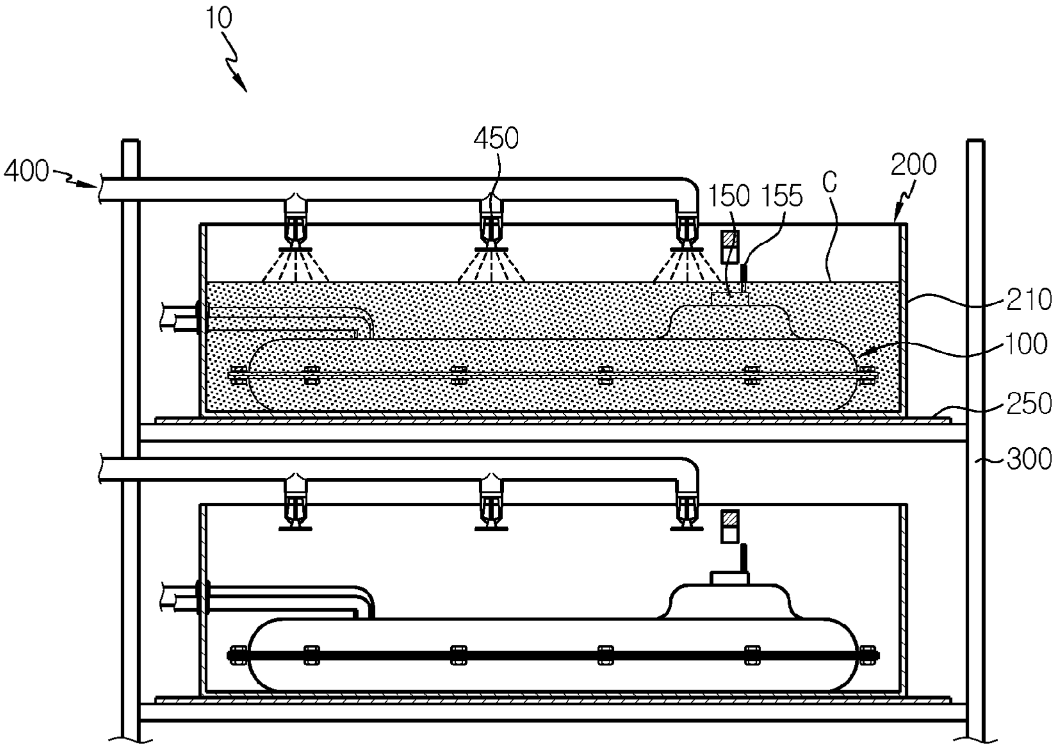

The water tank frame 210 may have an accommodation space which is exposed to top, for receiving the at least one battery pack 100, and the accommodation space may be filled with the coolant C (see FIG. 7).

The water tank frame 210 may include at least one cable through-hole portion 212, at least one cable sealing member 214, a cooling inlet through-hole portion 215, a cooling outlet through-hole portion 216, an inlet sealing member 217 and an outlet sealing member 218.

The at least one cable through-hole portion 212 may be disposed on one side of the battery pack frame 200, to be specific, one side of the water tank frame 210, and may allow at least one electrical cable 700 to pass through the at least one cable through-hole portion 212 to connect to the at least one battery pack 100.

The at least one cable sealing member 214 is configured to prevent the leakage of the coolant C through the at least one cable through-hole portion 212, and may be mounted in the at least one cable through-hole portion 212.

The at least one cable sealing member 214 may be mounted in the at least one cable through-hole portion 212. When the water tank frame 210 is filled with the coolant C (see FIG. 7), the at least one cable sealing member 214 may prevent the leakage of the coolant C from the water tank frame 210 through the cable through-hole portion 212.

The cooling inlet through-hole portion 215 may be disposed on one side of the battery pack frame 200, to be specific, one side of the water tank frame 210, and may allow a cooling inlet 800 for cooling of the battery pack 100 to pass therethrough.

The cooling outlet through-hole portion 216 may be disposed on one side of the battery pack frame 200, to be specific, one side of the water tank frame 210, and may allow a cooling outlet 900 for cooling of the battery pack 100 to pass therethrough.

The inlet sealing member 217 may be mounted in the cooling inlet through-hole portion 215. When the water tank frame 210 is filled with the coolant C (see FIG. 7), the inlet sealing member 217 may prevent the leakage of the coolant C from the water tank frame 210 through the cooling inlet through-hole portion 215.

The outlet sealing member 218 may be mounted in the cooling outlet through-hole portion 216. When the water tank frame 210 is filled with the coolant C (see FIG. 7), the outlet sealing member 218 may prevent the leakage of the coolant C from the water tank frame 210 through the cooling outlet through-hole portion 216.

The support frame 250 may be disposed below the water tank frame 210, and its edge may extend outward from the bottom edge of the water tank frame 210. That is, the support frame 250 may have a wider area than the bottom area of the water tank frame 210.

The support frame 250 may ensure the strength of the battery pack frame 200. Furthermore, the support frame 250 may prevent the entry of the coolant C into the water tank frame 210 of the adjacent battery pack frame 200 when the coolant C (see FIG. 8) flows over the water tank frame 210.

Figure 4:
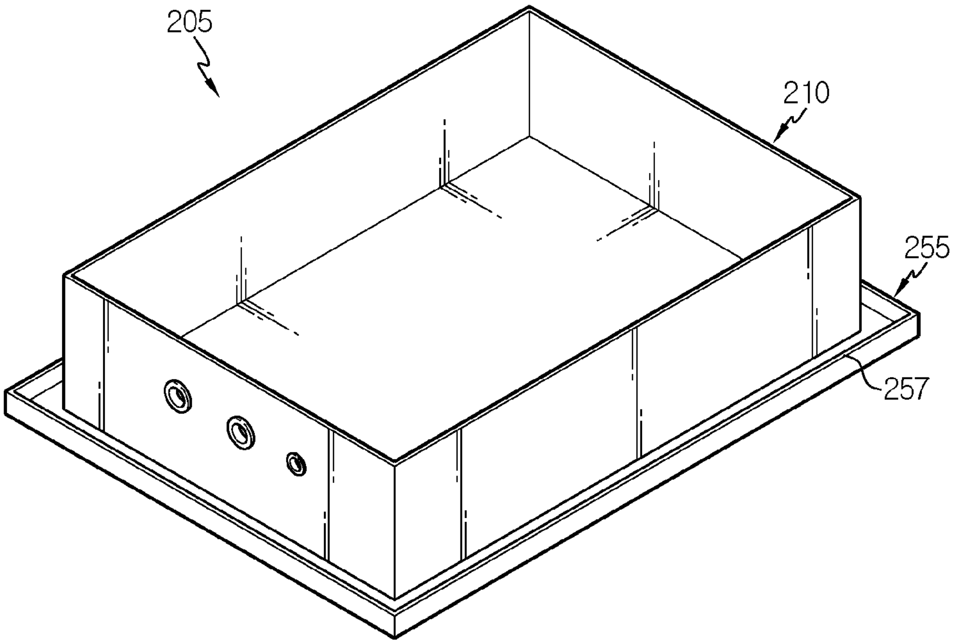
FIG. 4 is a diagram illustrating a support frame according to another embodiment of the battery pack frame of FIG. 3.

FIG. 4 is a diagram illustrating a support frame according to another embodiment of the battery pack frame of FIG. 3.

Referring to FIG. 4, the battery pack frame 205 may include a water tank frame 210 and a support frame 255.

The water tank frame 210 is substantially identical or similar to the previous embodiment, and an overlapping description is omitted.

The support frame 255 may have a step portion 257 having a predetermined height at its edge to prevent the coolant C from flowing down when the coolant C (see FIG. 9) leaks from the water tank frame 210.

Through the step portion 257, an additional coolant accommodation space may be formed at the edge of the support frame 255 to further hold the coolant C to the predetermined height. Furthermore, a drain pipe may be connected to one side of the additional coolant accommodation space at the edge of the support frame 255 to drain the coolant C.

Hereinafter, the other main components of the battery rack 10 will be described in more detail.

Figure 5:
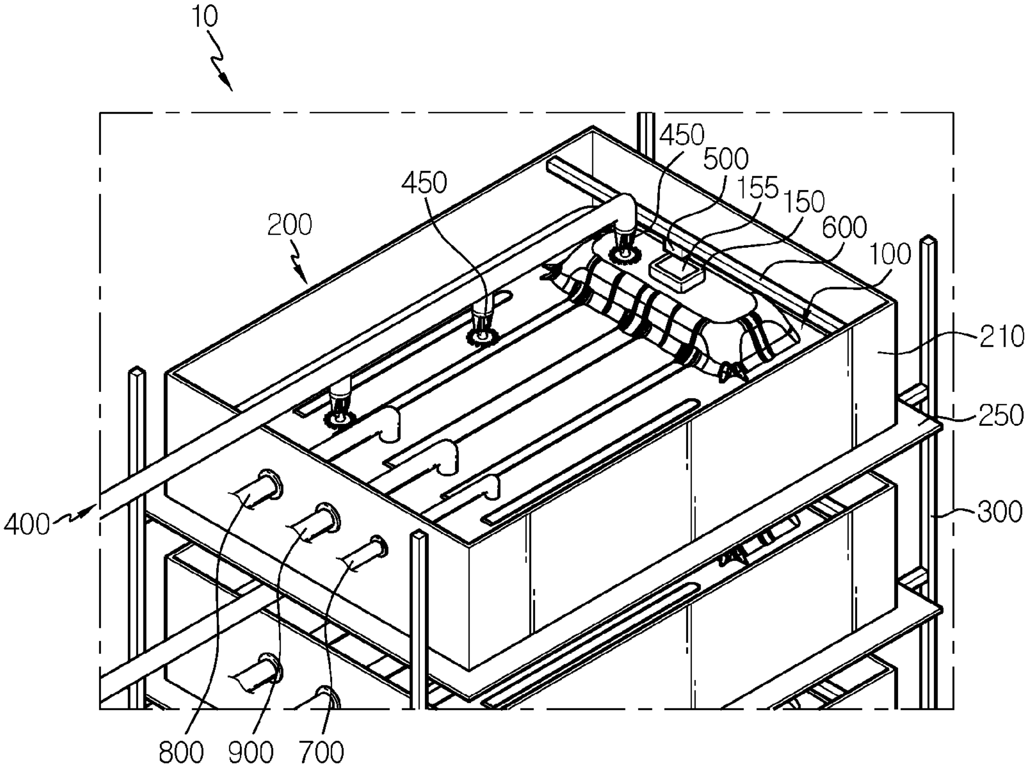
FIG. 5 is a diagram illustrating the main parts of the battery rack of FIG. 1.

FIG. 5 is a diagram illustrating the main parts of the battery rack of FIG. 1.

Referring to FIG. 5, the battery rack 10 may further include a rack frame 300, the feed pipe 400, the smoke detection sensor 500, the sensor support 600, the at least one electrical cable 700, the cooling inlet 800 and the cooling outlet 900.

The rack frame 300 may support the plurality of battery pack frames 200 and guide the vertical stack of the plurality of battery pack frames 200.

A plurality of feed pipes 400 may be included, and may be disposed above each battery pack frame 200. The feed pipes 400 may be connected to a coolant tank (not shown) outside of the battery rack 10.

Each feed pipe 400 may include at least one sprinkler 450 to spray the coolant C onto the at least one battery pack 100.

The at least one sprinkler 450 may disposed above the battery pack 100 above the battery pack frame 200. One or more sprinklers 450 may be included. Hereinafter, this embodiment is described based on the plurality of sprinklers 450.

The smoke detection sensor 500 may detect smoke coming out of the battery pack 100 to detect a fire when the fire occurred due to overheat of the battery pack 100.

The smoke detection sensor 500 may be disposed above the service plug 150 of the battery pack 100 where smoke is highly likely to first come out of the battery pack 100.

The sensor support 600 is configured to support the smoke detection sensor 500 more stably, and may have a bar shape having a predetermined length and may be mounted in the water tank frame 210 of the battery pack frame 200.

The at least one electrical cable 700 is used to connect the electrical components inside of the battery pack 100 to an external electrical unit, and may be connected to the battery pack 100.

The at least one electrical cable 700 may be connected to the battery pack 100 in the water tank frame 210 through the cable through-hole portion 212 of the water tank frame 210 of the battery pack frame 200.

The at least one electrical cable 700 may have a waterproof sealing coating on the outer surface to prevent an electrical short when the water tank frame 210 is filled with the coolant C (see FIG. 7).

The cooling inlet 800 is used to cool the battery pack 100, and may connect the external cooling unit to the battery pack 100. The cooling inlet 800 may be connected to the battery pack 100 in the water tank frame 210 through the cooling inlet through-hole portion 215 of the water tank frame 210.

The cooling outlet 900 is used to cool the battery pack 100, and may connect the external cooling unit to the battery pack 100. The cooling outlet 900 may be connected to the battery pack 100 in the water tank frame 210 through the cooling inlet through-hole portion 215 of the water tank frame 210.

Hereinafter, the mechanism for preventing the spread of the fire in the event of the abnormal situation caused by overheat of the battery pack 100 of the battery rack 10 according to this embodiment will be described in more detail.

Figure 6:
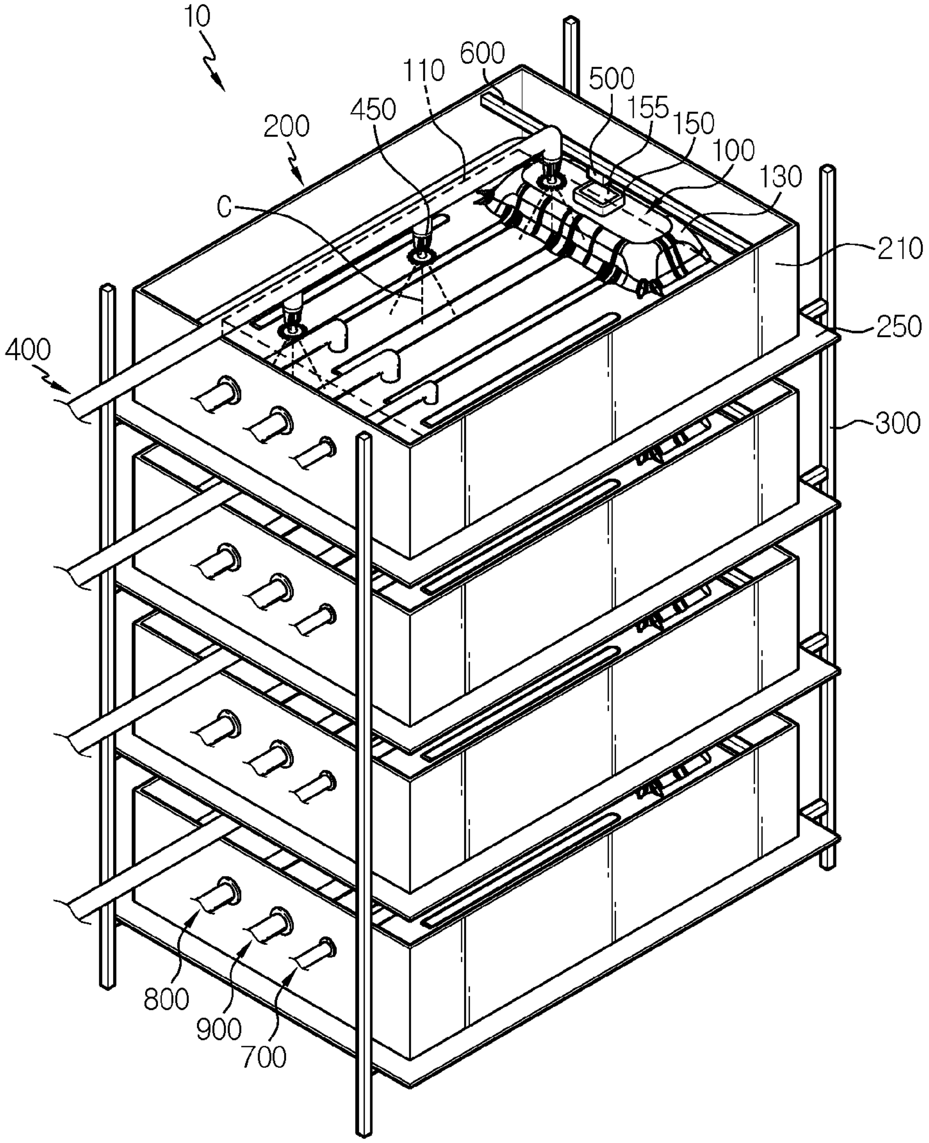
FIGS. 6 and 7 are diagrams illustrating a coolant feed mechanism for preventing the spread of a fire in the event of an abnormal situation caused by overheat of the battery pack of the battery rack of FIG. 1.

FIGS. 6 and 7 are diagrams illustrating the coolant feed mechanism for preventing the spread of the fire in the event of the abnormal situation caused by overheat of the battery pack of the battery rack of FIG. 1.

Referring to FIGS. 6 and 7, in the battery rack 10, the abnormal situation may occur in at least one specific battery pack 100. Since the battery pack 100 is the reuse battery pack used for the predetermined period of time or of which the predetermined capacity consumed, the abnormal situation may occur due to overheat, causing a fire.

In this embodiment, when the fire occurs due to the abnormal situation caused by overheat of the specific battery pack 100, for example, the topmost battery pack 100 of the battery rack 10, it is possible to put out the fire in the specific battery pack 100 more quickly and prevent the spread of heat to the adjacent battery pack 100 more quickly.

Specifically, in the abnormal situation, when the battery pack 100 is overheated and smoke or flames occur, the smoke detection sensor 500 may detect the smoke, thereby detecting the abnormal situation quickly. When the smoke is detected by the smoke detection sensor 500, the coolant C may be quickly sprayed onto the battery pack 100 in which the abnormal situation occurred from the sprinklers 450 of the feed pipe 400 above the battery pack 100 in which the abnormal situation occurred.

In this instance, when the internal pressure of the battery pack 100 rises above the predetermined pressure, the plug cover 155 of the service plug 150 of the battery pack 100 may be opened to make the inside and outside of the battery pack 100 communicate with each other.

Accordingly, the coolant C sprayed from the sprinklers 450 may be directly fed into the battery pack 100 through the opened service plug 150, thereby putting out the fire more quickly and preventing the spread of heat to the adjacent battery pack 100 more rapidly and quickly.

The spray of the coolant C through the sprinklers 450 may continue until the battery pack 100 is submerged in the coolant C in the water tank frame 210 of the battery pack frame 200 to completely put out the fire in the battery pack 100.

Figure 8:
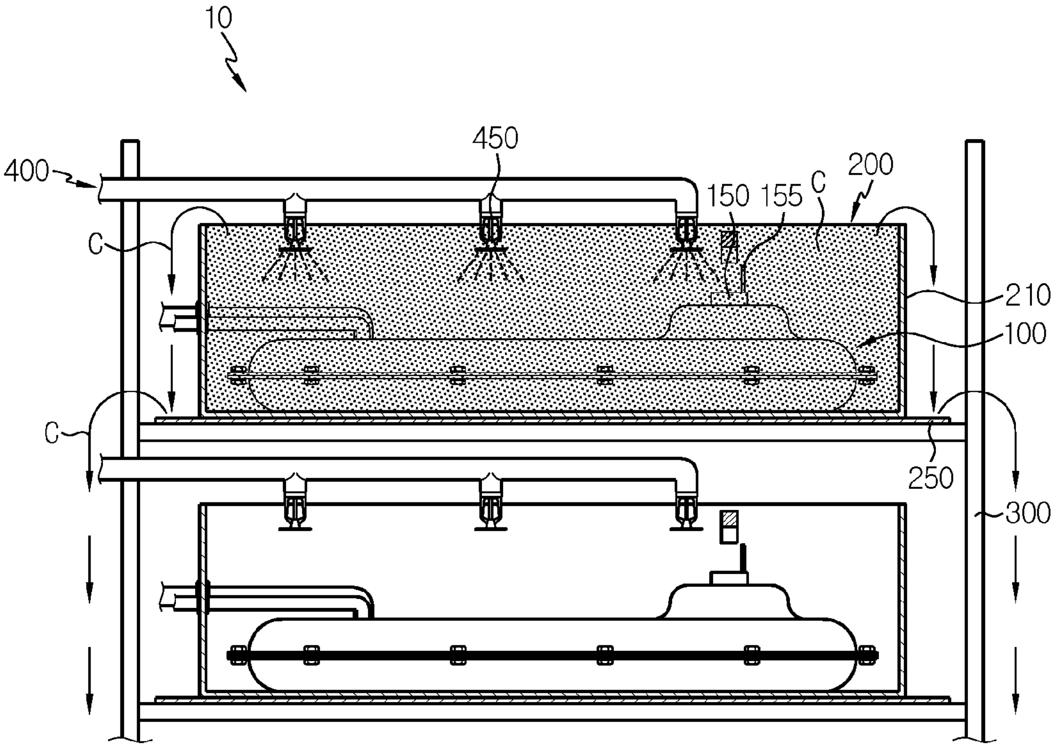
FIGS. 8 and 9 are diagrams illustrating the mechanism for preventing the entry of coolant into an underlying battery pack below the battery pack in which an abnormal situation occurred when feeding the coolant in FIG. 7.
Figure 9:
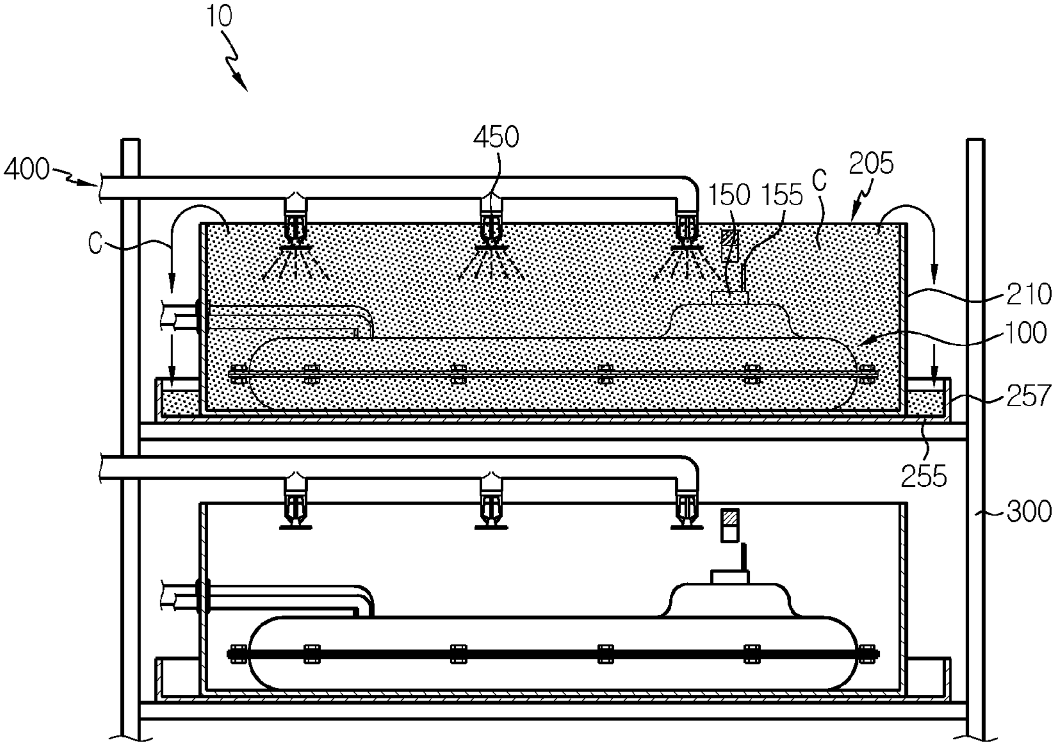

FIGS. 8 and 9 are diagrams illustrating the mechanism for preventing the entry of the coolant into the underlying battery pack below the battery pack in which the abnormal situation occurred when feeding the coolant in FIG. 7.

Referring to FIG. 8, during the spray of the coolant C through the sprinklers 450, the coolant C may flow over the water tank frame 210 of the battery pack frame 200.

In this embodiment, since the support frame 250 of the battery pack frame 200 extends outward from the water tank frame 210, it is possible to prevent the coolant C from entering the adjacent battery pack 100, to be specific, the underlying battery pack 100 when the coolant C flows over the water tank frame 210.

Accordingly, in this embodiment, through the support frame 250, it is possible to effectively prevent damage caused by the coolant C to the other battery pack 100 in which the fire did not occur.

Referring to FIG. 9, in case that the support frame 255 of the battery pack frame 205 has the step portion 257, the coolant C may be further held in the internal space formed by the step portion 257 when the coolant C flows over the water tank frame 210.

Accordingly, since the coolant C is further held in the internal space through the step portion 257 to the predetermined height when the coolant C flows over the water tank frame 210, it is possible to further delay the time when the overflowing coolant C pours down. Furthermore, it is possible to prevent the coolant C from flowing down more effectively by stopping the spray of the coolant C from the sprinklers 450 for the delayed time.

Here, an additional drain pipe may be connected to the internal space formed by the step portion 257, and in this instance, the coolant C may exit through the additional drain pipe, so it is possible to prevent the entry of the coolant C into the underlying battery pack 100 more effectively.

Figure 10:
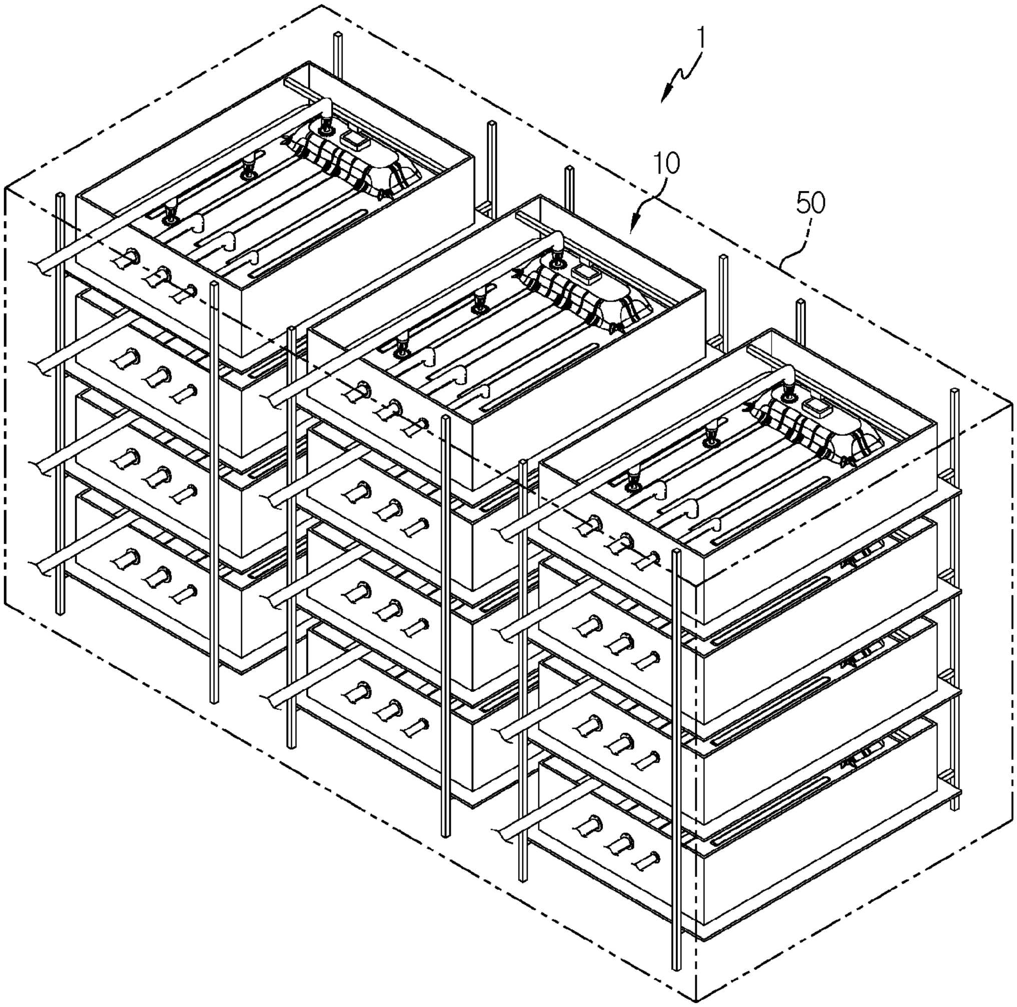
FIG. 10 is a diagram illustrating an energy storage system according to an embodiment of the present disclosure.

FIG. 10 is a diagram illustrating an energy storage system according to an embodiment of the present disclosure.

Referring to FIG. 10, the energy storage system 1 may include at least one battery rack 10 of the previous embodiment and a rack container 50 accommodating the at least one battery rack 10.

One or more battery racks 10 may be included. Hereinafter, this embodiment is described based on the plurality of battery racks 10.

Furthermore, the plurality of battery racks 10 may include a combination of the battery racks 10 including the battery packs 100 used for the predetermined period of time or of which the predetermined capacity consumed and battery racks including the general battery packs.

The rack container 50 may be configured to accommodate the plurality of battery racks 10, and may have an accommodation space in which the plurality of battery racks 10 is received.

As described above, the energy storage system 1 according to this embodiment may include the battery packs 100 (see FIG. 1) used for the predetermined period of time or of which the predetermined capacity consumed, such as the battery packs used in electric vehicles or hybrid electric vehicles.

As described above, since the energy storage system 1 according to this embodiment includes the battery packs 100 used in vehicles that are usually discarded after wasted, it is possible to achieve cost savings associated with resource recycling and solve the environmental pollution problem caused by the wasted battery packs 100.

According to the above-described various embodiments, it is possible to provide the battery pack frame 200 for receiving the battery pack 100 for reuse after the use for the predetermined period of time or of which the predetermined capacity consumed more stably and ensuring safety when a fire occurs due to an abnormal situation such as overheat, and the battery rack 10 and the energy storage system 1 including the same.

While an exemplary embodiment of the present disclosure has been hereinabove illustrated and described, the present disclosure is not limited to the above-described particular embodiment and it is obvious to those skilled in the art that a variety of modifications and changes may be made thereto without departing from the claimed subject matter of the present disclosure in the appended claims, and such modifications and changes should not be individually understood from the technical aspects or features of the present disclosure.

What is claimed is:

1. A battery rack comprising:

at least one battery pack used for a predetermined period of time or of which a predetermined capacity is consumed; and a battery pack frame accommodating the at least one battery pack and having a height greater than a height of the at least one battery pack, wherein the at least one battery pack includes a service plug mounted on a pack case and configured to open an inside of the at least one battery pack, wherein the service plug is configured to disconnect an electrical connection of the battery pack, wherein the service plug includes a plug cover that opens the service plug to the inside of the at least one battery pack in response to an internal pressure of the at least one battery pack rising above a predetermined pressure in the event of an abnormal situation, thereby allowing the service plug to guide injection of a coolant into the at least one battery pack.

2. The battery rack according to claim 1, wherein the coolant is injected into the battery pack frame such that the at least one battery pack is submerged in the coolant at a predetermined depth when the abnormal situation occurs in the at least one battery pack.

3. The battery rack according to claim 1, wherein the service plug is disposed on an upper surface of the at least one battery pack.

4. The battery rack according to claim 1, wherein at least one feed pipe for feeding the coolant is disposed above the battery pack frame.

5. The battery pack frame according to claim 4, wherein the at least one feed pipe includes at least one sprinkler to spray the coolant onto the at least one battery pack.

6. The battery pack frame according to claim 5, wherein the service plug is disposed close to the at least one sprinkler.

7. The battery rack according to claim 1, wherein the battery pack frame further comprises at least one cable through-hole portion, wherein at least one electrical cable is passed through the at least one cable through-hole portion to connect to the at least one battery pack.

8. The battery rack according to claim 7, wherein at least one cable sealing member is mounted in the at least one cable through-hole portion.

9. The battery rack according to claim 1, wherein the at least one battery pack is a used battery pack from an electric vehicle or a hybrid electric vehicle.

10. The battery rack according to claim 1, wherein the at least one battery pack is comprised in a plurality of battery packs, and wherein each of the plurality of battery packs is stacked on top of each other in a height direction of the battery rack such that the battery packs are electrically connected to each other.

11. An energy storage system comprising at least one battery rack according to claim 1.

* * * * *